US008152635B2

(12) United States Patent
Leingang et al.

(10) Patent No.: US 8,152,635 B2
(45) Date of Patent: Apr. 10, 2012

(54) PROVIDING NETWORK AND GAME CONTENT BASED ON WIRELESS SIGNALS

(75) Inventors: Justin Leingang, Austin, TX (US); Jeffrey Scott White, Spicewood, TX (US)

(73) Assignee: Aspyr Media, Inc., Austin, TX (US)

( * ) Notice: Subject to any disclaimer, the term of this patent is extended or adjusted under 35 U.S.C. 154(b) by 287 days.

(21) Appl. No.: 12/684,369

(22) Filed: Jan. 8, 2010

(65) Prior Publication Data

US 2010/0144434 A1    Jun. 10, 2010

Related U.S. Application Data

(63) Continuation-in-part of application No. 12/265,587, filed on Nov. 5, 2008.

(51) Int. Cl.
  *A63F 9/24* (2006.01)
(52) U.S. Cl. ............................................. 463/29; 705/50
(58) Field of Classification Search ...................... 463/29
  See application file for complete search history.

(56) References Cited

U.S. PATENT DOCUMENTS

| | | | |
|---|---|---|---|
| 5,810,680 A | 9/1998 | Lobb et al. | |
| 6,320,495 B1 | 11/2001 | Sporgis | |
| 6,509,869 B2 | 1/2003 | Aoyama | |
| 6,932,698 B2 * | 8/2005 | Sprogis | 463/9 |
| 7,398,151 B1 | 7/2008 | Burrell et al. | |
| 7,435,179 B1 | 10/2008 | Ford | |
| 7,450,954 B2 * | 11/2008 | Randall | 455/456.1 |
| 7,787,627 B2 * | 8/2010 | Sood et al. | 380/277 |
| 2001/0018349 A1 * | 8/2001 | Kinnunen et al. | 455/456 |
| 2003/0155413 A1 * | 8/2003 | Kovesdi et al. | 235/375 |
| 2008/0102957 A1 * | 5/2008 | Burman et al. | 463/42 |
| 2008/0109679 A1 * | 5/2008 | Wright et al. | 714/37 |
| 2008/0113614 A1 * | 5/2008 | Rosenblatt | 455/3.05 |
| 2008/0167049 A1 * | 7/2008 | Karr et al. | 455/456.2 |
| 2008/0176583 A1 | 7/2008 | Brachet et al. | |
| 2008/0304427 A1 * | 12/2008 | Biswas et al. | 370/255 |
| 2009/0274094 A1 * | 11/2009 | Engwer | 370/328 |
| 2010/0113154 A1 | 5/2010 | Leingang | |

OTHER PUBLICATIONS

"Feeding Yoshi v1.2"; Dec. 2005; Accessed from Internet at http://freewareppc.com/games/feedingyoshi.shtml.
Marek Bell, et al.; "Interweaving Mobile Games with Everyday Life"; ACM; Conference on Human Factors in Computing Systems; 2006; 10 pages.

(Continued)

*Primary Examiner* — Jamie Kucab
(74) *Attorney, Agent, or Firm* — Meyertons Hood Kivlin Kowert & Goetzel, P.C.; Jeffrey C. Hood; Joel L. Stevens

(57) ABSTRACT

Providing content on a web site based on content in a game based. A wireless signal may be detected. Content in a game may be provided based on the detection of the wireless signal. The content may have been unavailable in the game prior to said detecting the wireless signal. For example, a characteristic of the wireless signal (e.g., an ID of a wireless signal from a wireless access point) may be determined and the content may be based on the characteristic of the wireless signal. Information regarding the content may be provided to one or more computer systems over a network, which may be configured to provide an indication of the content in the game on the web site based on the information.

17 Claims, 11 Drawing Sheets

OTHER PUBLICATIONS

"Wi-Fi Treasure Hunting Game to Hit DS"; Dec. 15, 2008. Accessed from Internet at http://ben.kirman.org/2008/12/15/wi-fi-treasure-hunting-game-to-hit-ds/.

Johan Peitz et al.; "Insectopia: Exploring Pervasive Games Through Technology Already Pervasively Available"; ACM; ACM International Conference Proceeding Series vol. 203; 2007; 8 pages.

"Insectopia"; Nov. 2007; Accessed from Internet at http://www.mupe.net/applications/product/insectopia/.

Brian Crecente; "In Plundr Size Matters"; Jun. 20, 2007; Accessed from Internet at http://kotaku.com/gaming/feature/in-plundr-size-matters-270428.php.

"Plundr"; Jun. 2007; Accessed from Internet at http://areacodeinc.com/work/plundr/.

"Nintendo DS Mixed-Reality Treasure Hunt"; Feb. 1, 2008; Accessed from Internet at http://www.pinktentacle.com/2008/02/nintendo-ds-mixed-reality-treasure-hunt/.

Official Action mailed Apr. 5, 2011 for U.S. Appl. No. 12/265,587; 9 pages.

\* cited by examiner

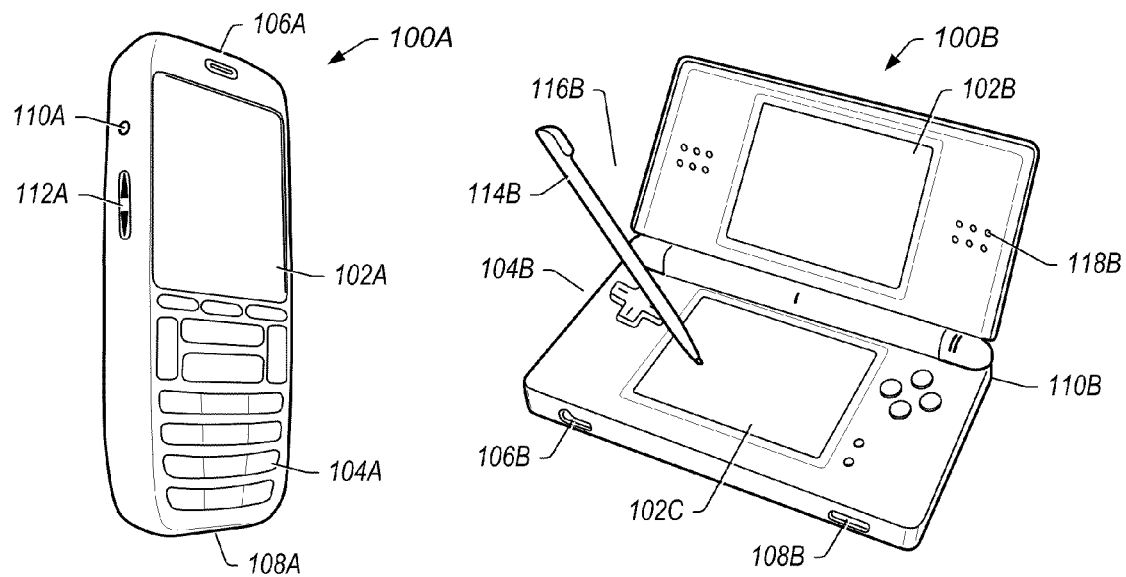
FIG. 1A
FIG. 1B
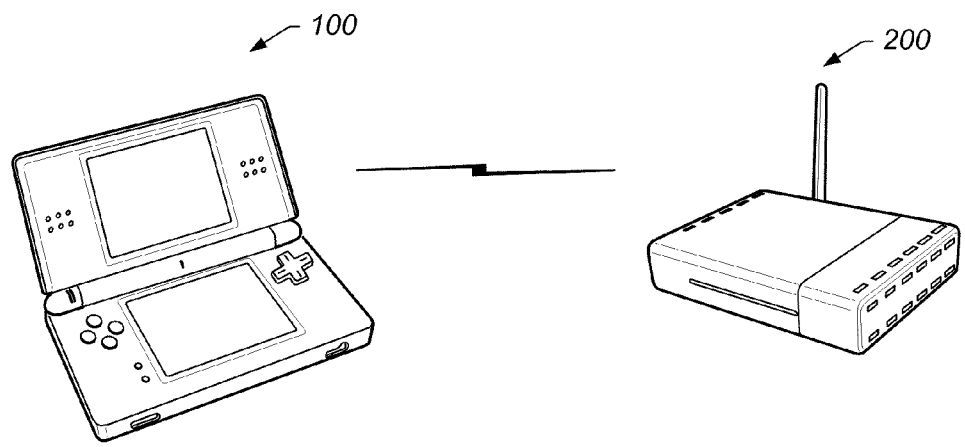
FIG. 2

FIG. 13E

PROVIDING NETWORK AND GAME CONTENT BASED ON WIRELESS SIGNALS

PRIORITY INFORMATION

This application is a continuation-in-part of U.S. utility application Ser. No. 12/265,587 titled "Providing Game Content Based on Wireless Signals," filed Nov. 5, 2008, whose inventor was Justin Leingang and which is hereby incorporated by reference in its entirety as though fully and completely set forth herein.

FIELD OF THE INVENTION

The present invention relates to the field of computer games, and more particularly to a system and method for providing game content based on wireless signals.

1. Description of the Related Art

Since the creation of basic computer games and gaming consoles, the field of computer games, as well as technologies associated with it, has increased dramatically. Many improvements have been made in the area of graphics in the gaming world, especially in creating realistic games. For example, while the initial games such as Galaga, Pacman, and Pong were in two dimensions with very simple graphics, modern day games have sophisticated physics and three dimensional graphics engines, such as Gears of War, World of Warcraft, and Half Life. Games have also been able to integrate the massive connectivity of the Internet with the gaming experience. For example, many players can form groups and compete online, e.g., in Guild Wars, Diablo II, World of Warcraft, Starcraft, etc.

In such a thriving industry, game developers constantly try to come up with innovative ideas that have not yet been created or imagined by other developers in order to provide a better gaming experience for players, thus increasing the popularity of the game. Accordingly, improvements and innovations in the field of gaming are desired.

SUMMARY OF THE INVENTION

Various embodiments are provided of a system and method for providing game content based on wireless signals or location information.

A game may be stored, e.g., in a portable device. The portable device may include a processor, a wireless receiver, a display, one or more inputs, and one or more memory mediums. In one embodiment, the game may be inserted into the portable device in a cartridge or card format. Alternatively, or additionally, the game may be stored via a network, e.g., the Internet. For example, the game could be downloaded (e.g., from the Internet) and stored on an internal hard drive of the portable device, as desired.

A game may be executed and provided on the display. User input may be received via the one or more inputs to interact with the game.

A wireless signal may be detected by the portable device, e.g., may be received by the wireless receiver. In one embodiment, the wireless signal may be detected while the game is being actively displayed, e.g., on the portable device. Alternatively, the wireless signal may be detected when the game and/or portable device is in a sleep mode, e.g., when the game is not displayed actively on the device. The wireless signal may be received from a wireless access point, another portable device, and/or any other source of wireless communication signals. In one embodiment, the wireless signal may include an ID of the wireless signal.

A characteristic of the wireless signal may be determined. For example, the ID of the wireless signal may be determined. A hash of the characteristic of the wireless signal may be determined. Thus, in one embodiment, the characteristic of the signal may be determined (e.g., the ID of the wireless signal) and a hash of that characteristic may be generated.

Content may be provided in the game based on the wireless signal (e.g., based on the wireless signal, the characteristic of the wireless signal, and/or a hash of the characteristic of the wireless signal), according to various embodiments. The content may have been unavailable in the game prior to the detection of the wireless signal. For example, the content may be "unlocked" based on the wireless signal, the characteristic, and/or the hash of the characteristic. Alternatively, the content may be retrieved over a network upon detection of the wireless signal. In one embodiment, the content may include a reward, e.g., for finding or discovering a new wireless signal (e.g., from a new wireless access point). In some embodiments, the content may be stored in the memory medium (e.g., of the portable device and/or on the cartridge), may be downloaded over a network (e.g., the Internet) dynamically upon detection of the wireless signal, and/or may have been previously downloaded over the network, but not available in the game. The content may be provided while the game is being actively displayed, or may be provided the next time the game is actively displayed, according to various embodiments.

The content may be any of various content. For example, the content may be an object or item that the user may use in the game, such as an item of apparel or clothing. Alternatively, or additionally, the object may be a weapon, e.g., that may be equipped by a user of the game. However, the object may not be a "wearable" object, but may be a pet, monster, stationary object, etc. In further embodiments, the content may be a new level or area for the user to play, among other embodiments.

Information regarding the content may be provided (e.g., automatically) to one or more computer systems over a network, e.g., one or more web servers. For example, the information may specify any new content that has been unlocked to the portable device. Alternatively, or additionally, the information may specify how various objects (e.g., new content) have been used in the game. The computer systems may be configured to provide an indication of the content in the game on a web site based on the provided information.

For example, as indicated above, the content provided above may be an object which the user may manipulate or place in an area of the game (e.g., a treasurescape). Accordingly, the information may indicate the object itself and/or the placement of the object. In this example, the computer system(s) may provide an indication of the object or the placement on a web site, e.g., for other users to see the new object. In further embodiments, an avatar in the game may wear the object, and the new object and/or the updated appearance of the object may be displayed on the web site. More specifically, in one embodiment, the user's avatar appearance in the game may be reflected on the web site (e.g., in a profile web site of that particular user). In further embodiments, the content may be used to create one or more songs, and the information may correspond to the song(s). Accordingly, the one or more songs may be indicated (or even provided) on the web site based on the information.

Thus, updates to the game (e.g., based on new content) may be reflected on a web site, e.g., based on information provided by the portable device.

The method regarding the portable device above may be applied to other devices and/or may be embodied as a computer program, e.g., as program instructions stored on a memory medium that are executable by a processor to perform the method.

Thus an embodiment disclosed herein may operate to provide a game or entertainment feature to users, whereby a user of a respective portable device can attempt to locate access points in various locations to unlock gaming content for the game program executing on the portable device. Each user can thus collect content ("treasures") within their game. Further, different users can compete with each other, each attempting to unlock more or different gaming content than other players. Information regarding content obtained by (e.g., unlocked by) a user may be automatically provided to a website for viewing by other players. Embodiments of the invention also contemplate a community of gaming users which share content with each other and provide hints to each other in the collection of treasures.

BRIEF DESCRIPTION OF THE DRAWINGS

A better understanding of the present invention can be obtained when the following detailed description of the preferred embodiment is considered in conjunction with the following drawings, in which:

FIG. 1 illustrates an exemplary portable device, according to one embodiment;

FIG. 2 illustrates a portable device wireless communicating with another device, according to one embodiment;

FIGS. 13A-13E are exemplary screenshots corresponding to the method of FIG. 12, according to one embodiment.

Figure 3:
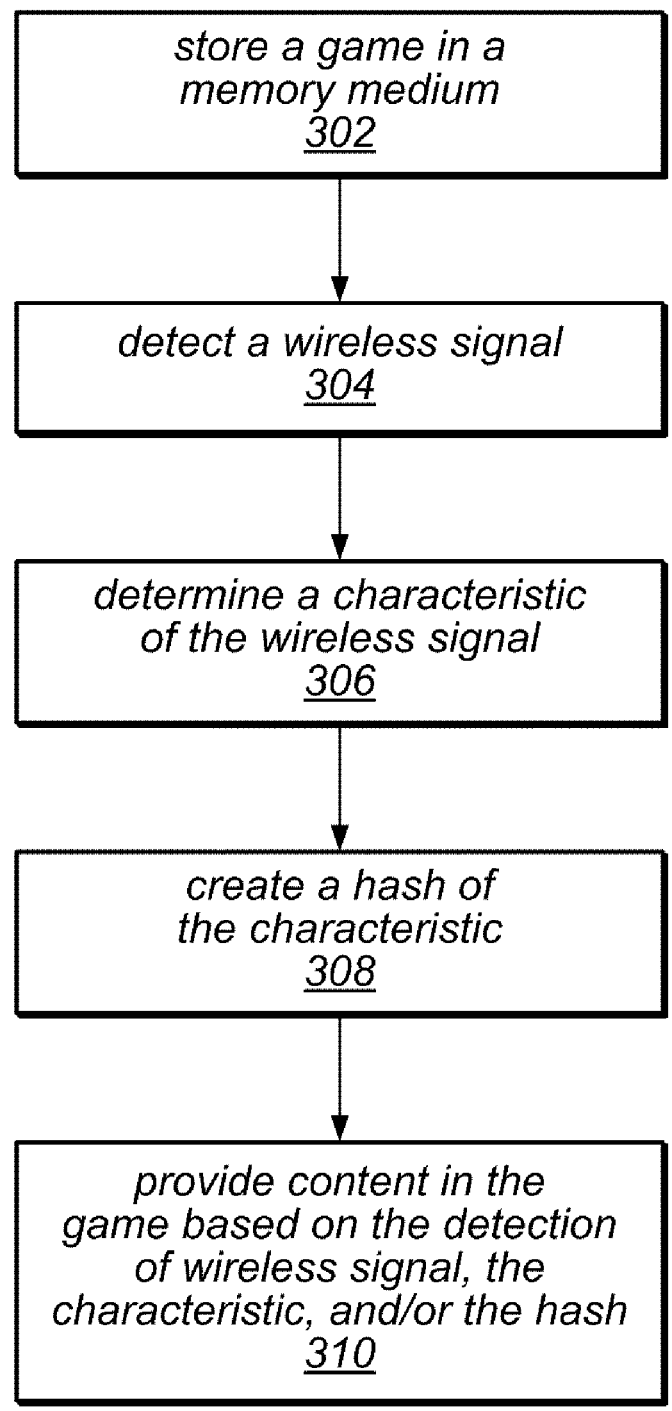
FIG. 3 is a flow chart diagram illustrating one embodiment of a method for providing content in a game based on a wireless signal.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Portable Device—any of various types of computer systems which are mobile or portable, including portable gaming devices (e.g., Nintendo DS™, PlayStation Portable™, Gameboy Advance™, iPhone™), laptops, PDAs, mobile telephones, handheld devices, portable Internet devices, music players, data storage devices, etc. In general, the term "portable device" can be broadly defined to encompass any electronic, computing, and/or telecommunications device (or combination of devices) which is easily transported by a user. In various embodiments described herein, the portable device may include a wireless signal receiver and may also include GPS circuitry.

Wireless Device—any of various devices which are capable of communicating wirelessly. Wireless Device is a superset of portable devices with wireless capabilities (e.g., a Wireless Device may be portable or stationary). Wireless devices include wireless access points (e.g., wireless routers) and other devices capable of communicating in a wireless fashion.

Game—an interactive software program that is executable by a computer system for the purposes of entertainment of the user. The game may be any of various types, e.g., first person shooter, role playing game, adventure game, simulation game, or a collection game, among other possible game types. The game may have a goal (e.g., a time based or accomplishment based goal) or may not (e.g., where the user simply creates and/or interacts with a simulated environment or world). The game may be executed by a general computing system, a gaming console (e.g., Nintendo Wii™, Xbox 360™, PS3™, etc.), a portable gaming device, a cell phone or smart phone, and/or any other type of computer system. The game may be inserted as a cartridge into the computing system, e.g., for loading into memory of the computing system, or may simply be stored or downloaded into memory of the computing system.

FIG. 1—Exemplary Portable Device

FIG. 1 illustrates an exemplary portable device 100A and alternate portable device 100B. As shown, the portable device 100A includes a display 102A, interface buttons 104A, power button 106A, docking/charging port 108A, audio port 110A, and volume controls 112A. Note that these elements are exemplary only and that any of these features may be removed or substituted with others as desired. Note further that the shape and type of the portable device 100A is exemplary only. For example, while the current exemplary portable device 100A resembles a PDA or mobile telephone, the portable device 100A may be a portable computer or laptop, among other types of form factors/portable devices, such as portable device 100B, described below. Furthermore, in some embodiments, the interface buttons 104 may be removed or replaced with a single interface button. Additionally, or alternatively, the display may be a touch or multi-touch display which may receive input via the user touching the display, e.g., with fingers, stylus, etc.

As also shown, exemplary portable device 100B includes display 102B and 102C, interface buttons 104B, power button 106B, charging port 108B, audio port 110B, volume control 112B, stylus 114B, game port 116B, and speakers 118B. In this example, the portable device 100B resembles a portable gaming device similar to the Nintendo DS™ although other form factors and portable gaming devices are envisioned. References to the portable device 100 may refer to both the portable devices 100A and/or 100B.

The portable device 100 may include one or more processors and memory mediums for executing programs and/or Operating System(s). The programs stored in the memory medium may be executable to perform functionality of the portable device 100. For example, the portable device 100 may store a program for playing games (e.g., external cartridge games inserted into the port 116B), audio files on the portable device, making telephone calls, browsing the Internet, checking email, etc. Furthermore, the portable device 100 may include one or more ports for peripherals, e.g., keyboards, mice, microphones, etc., as desired.

FIG. 2—Portable Device in Communication with a Wireless Device

As shown in FIG. 2, the portable device 100 may be wirelessly connected to a second wireless device 200 when the portable device 100 is in proximity to the second wireless device 200. The second wireless device 200 may be another portable device similar to the portable device 100. For example, both the portable device 100 and the wireless device 200 may both be portable gaming devices, such as Nintendo DSs™ which are capable of communicating with each other in a wireless manner, e.g., to play games. Alternatively, the wireless device 200 may be a wireless router or wireless access point that provides wireless communication for a plurality of other wireless devices or portable devices, such as the portable device 100. For example, the wireless device 200 may be a primarily stationary device that may be coupled to or include a modem which is connected to the Internet, thereby providing Internet access for a plurality of wireless devices. In one embodiment, the wireless device 200 may provide wireless signals according to the 802.11x protocol. Alternatively, or additionally, the wireless device 200 may provide Bluetooth communication signals, provide WiMAX communication signals, and/or other wireless communication signals, as desired.

The wireless device 200 may include a memory medium and processor, which may execute program instructions stored on the memory medium to perform at least a portion of the functionality of the wireless device 200. Additionally, the wireless device 200 may provide wireless signals which include an identification of the wireless device 200. Further details regarding the wireless signals and their use by the portable device 100 are described below, with respect to FIG. 3.

FIG. 3—Method for Providing Content in a Game Based on Wireless Signals

FIG. 3 illustrates an exemplary method for providing content in a game based on wireless signals. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a game may be stored or executed, e.g., by a portable device. The game may be any of various types, e.g., first person shooter, role playing game, adventure game, simulation game, or a collection game, among other possible game types. As indicated above, the game may be executed by a portable gaming device, a cell phone or smart phone, and/or any other type of portable device. In some embodiments, the game may be inserted as a cartridge into the portable device, and the portable device may load the game into memory for execution by a processor. Alternatively, the game may be stored in a memory medium of the portable device. For example, the game may have been downloaded or installed over a network, or may have been previously loaded onto the portable device from a computer or console gaming devices, according to various embodiments.

In one embodiment, the game may be stored on a stationary device and/or in part in the portable device. For example, the portable device may act as a portable extension of the stationary device. The stationary device could be any of various gaming consoles (e.g., Nintendo Wii™, Xbox 360™, PS3™, etc.) or computer systems, such as a general purpose computer.

In 304, a wireless signal may be detected, e.g., by a wireless receiver of the portable device. The source of the wireless signal may be any of various wireless devices. For example, as described above regarding FIG. 2, the source may be another portable device, a wireless access point, and/or other wireless devices (e.g., smart phones). In one embodiment, the portable device may be a portable gaming device and which may receive the wireless signal from another portable gaming device, possibly executing or storing the same game.

The wireless signal may be detected when the portable device is at a first physical location. For example, the wireless signal may be detected when the portable device is in range of wireless signals being broadcast from the wireless device. As one example, the wireless device may be a wireless access point at a coffee store or book store (among other possible places for a wireless access point). The portable device may receive one or more wireless signals from the wireless access point when the portable device is within a radius of the wireless device. In one embodiment, the wireless signals may include an identification, e.g., a unique identification (or substantially unique identification), of the wireless device broadcasting the wireless signals. For example, the wireless signals may include a MAC address or SSID name of the wireless device. Alternatively, or additionally, the identity (e.g., the MAC address) may be determined via a communication between the portable device and the wireless device.

As indicated above, the wireless device may be another portable device, such as a portable gaming device. Similar to above, the wireless signals from the wireless device may identify, possibly uniquely, the other portable gaming device. For example, the wireless signals may include a MAC address of the wireless device. Alternatively, the identity of the other portable device may be determined via communication between the portable device and the other portable device.

In some embodiments, the game may be being executed and/or displayed actively on the portable device when the wireless signal is detected. For example, a user of the portable device may be actively playing a game, e.g., the game stored in 302. Alternatively, the game or portable device may be in a "sleep" or "inactive" mode where the game is not being executed or displayed, but the portable device may still be able to seek or receive wireless signals. For example, the portable device may be closed and turned off (even though it actually goes to a sleep mode). Thus, the wireless signal may still be detected even though the user may have stowed the device away, e.g., in a book bag or purse. Note that the user may be able to specify whether or not to actively search for wireless signals (e.g., in the guise of "treasure"), by selecting a "search" mode. In some embodiments, the portable device may be active, but not executing or displaying the game when the wireless signal is detected. For example, the user may be playing a different game or executing a different application on the portable device when the wireless signal is detected. Similar to above, the "search" mode may need to be activated for the wireless signal to be detected, although in some embodiments, this mode may always be active.

In 306, a characteristic of the wireless signal may be determined. In one embodiment, the characteristic may be determined by analyzing the received signal and/or by initiated communication to receive or determine characteristics. However, in some embodiments, the characteristic may not be determined based on communication, but simply based on the broadcasted wireless signal itself.

The characteristic may be any of various properties of the wireless signal. For example, as indicated above, the wireless signal may include an identification (ID) of the wireless device transmitting the wireless signal. In one embodiment, the characteristic of the wireless device may be a MAC address of the wireless device or an SSID of the wireless network provided by the wireless device. Thus, the characteristic of the wireless device may be an ID of the wireless device or the wireless network provided by the wireless device, although other characteristics are envisioned. The characteristic determined in 306 may be unique to the wireless device transmitting the wireless signal. For example, the unique characteristic may be the MAC address indicated above. However, the characteristic of the wireless signal may not be unique to the wireless device and/or may include properties of the wireless signal itself, e.g., amplitude, frequency, signal strength, etc.

In 308, a hash may be created from the characteristic (or a plurality of characteristics) of the wireless signal determined in 306. For example, a hash may be created from the MAC address or the SSID of the wireless network provided by the wireless device. In one embodiment, a hash may be created in order to convert the substantially unique ID of the wireless device (e.g., the MAC address) into a bounded set of possibilities, e.g., by using a particular hash algorithm that provides such a bounded set of results. The hashing function may be an FNV hashing algorithm, a "one at a time" hashing algorithm, a Bob Jenkin's hashing function, a Paul Hsieh hashing function, and/or any type of hashing function, as desired. For example, the hashing function could be the one described at http://www.azillionmonkeys.com/qed/hash.html.

In one embodiment the hash may be created from a plurality of characteristics. For example, the hash may incorporate or be generated in part based on properties of the wireless signal, the ID of the signal or associated wireless network, and/or other characteristics of the wireless signal. Thus, a hash may be created based on a characteristic of the wireless signal.

In 310, content may be provided in the game based on the detection of the wireless signal in 304, the determined characteristic in 306, and/or the hash created in 308. In other words, according to various embodiments, 306 and/or 308 may be optional. Thus, in one embodiment, the content may be provided simply based on the reception of the wireless signal. As one example, the portable device may determine whether or not the wireless signal is from a source that has not been discovered before (referred to as a "new" wireless signal) and then provide the content if it has not been discovered before, e.g., using a table of found wireless signals or sources. In one embodiment, a list of content to be unlocked may be stored in the memory medium. Thus, when a new wireless signal is found, the table or list may identify what content should be unlocked. The list may be unique or semiunique (i.e., where repetitions of the list among devices is relatively rare) to each device, or may be the same for each device, or any variation thereof, according to various embodiments. If the signal has been discovered before (and is therefore not new), the content may not be provided. In one embodiment, the determination whether the source has been found may be based on a characteristic of the signal, e.g., a MAC address, or other ID, of the source, although other characteristics are envisioned.

In an alternate embodiment, the characteristic of the signal may be determined and the characteristic may be used to determine the content to be provided (e.g., rather than a derivative of the characteristic, such as the hashing described above). For example, the content may be provided based on the MAC address of the wireless device providing the wireless signal. In another embodiment, the content may be provided based on a hash of the characteristic. Thus, according to various embodiments, the content may be provided based on the wireless signal, a characteristic of the wireless signal, and/or a hash of the characteristic of the wireless signal. Combinations of the above embodiments are also envisioned.

In some embodiments, the content may be a reward or collection item in the game. Thus, the reward may be provided based on discovery of a new wireless source, such as a wireless access point. However, it should be noted that in some embodiments, the user may not be aware that the new content is being provided based on detecting a new wireless source. For example, the user may simply see a notification of new content or "treasure" and may not specifically know why it appeared, other than the user having carried the portable device to a new location. As used herein, the content provided in the game may be referred to as "game content".

The content may have been unavailable in the game prior to detection of the wireless signal in 304. In some embodiments, the content may not have been stored as part of the game, and providing the content may involve downloading the content over a network, e.g., the Internet. Alternatively, the content may have been included in the game or stored along with the game (e.g., on the game cartridge), but may not have been visible or available to the user when playing the game prior to receiving the wireless signal. Thus, the content may be "unlocked" in response to reception of the wireless signal, determination of the characteristic of the signal, and/or generation of the hash of the characteristic of the signal, according to various embodiments.

In some embodiments, the content may be unlocked on a device or computing system which is not portable. For example, the content may be unlocked when the portable device is coupled to or attached to the computing or gaming system. The computing or gaming system may be any of various computing systems, such as Microsoft Xbox 360™, Sony PlayStation 3™, Nintendo Wii™, and/or a general computing system, among other possibilities.

Note that the provision of the game content based on the wireless signal or characteristic differs from simply updating a game when the Internet is available (e.g., through a wireless access point). Instead, the game content may be provided based on the discovery of a new wireless signal, and not simply to use the wireless signal to perform ordinary network functions (such as downloading updates).

The method may further include receiving a second wireless signal, e.g., at a second physical location and then providing second content (e.g., that is different than the first content) in the game based on the detection of the second wireless signal, a characteristic of the second wireless signal, and/or a hash of the characteristic of the second wireless signal.

In some embodiments, after the content is unlocked, the user may use it or arrange it in a "playground" area. The user may also be able to trade the new content or treasure (or content in general) with other users, e.g., when in communication with another portable device, online using a website or using the portable device when connected to the Internet. Additionally, the user may be able to purchase new treasures, e.g., using in game currency (e.g., which may be provided when the user unlocks collectibles, or when other actions or achievements are performed by the user in the game) or with real currency, according to various embodiments. Further, the user may be able to provide pictures of his/her "playground" by email or on a website for other users to see/envy.

Additional Embodiment

Alternatively, or additionally, the content may be provided in response to the portable device being located at a specific physical location. For example, the portable device may have GPS circuitry or other methods of determining the physical location of the portable device. Based on the portable device reaching a specific location (e.g., as stored in a table of physical locations, possibly on the portable device or provided over a network), the content may be provided in the game. The following describes an exemplary embodiment of such functionality.

The game software, which may usually be delivered to the portable device via digital download, uses both an algorithm and pre-set longitude and latitude locations to determine treasure spot locations. In one embodiment, the software may be constantly tracking the GPS location of the portable device. When the portable device comes within a certain area, e.g., within 50 feet, 100 feet, or some other desirable distance, of the treasure spot then the user unlocks a treasure.

For the algorithm, the number of treasures found worldwide can be easily set and that number can range anywhere from 1 spot to a billion spots. Additionally, it can also be easily determined how the spots are populated. For example, the spots may be concentrated around major population centers, along high-traffic areas, randomly or grid-based anywhere in the world, depending on preference. Each algorithmically-based location may provide the user with unlocked content, such as a treasure. Additionally, each version of the software may be consistent so that every user in the world finds the exact same treasure at the exact same spot.

For pre-set GPS locations, particular longitude and latitude locations may be embedded, but it may be a limited number of locations due to the man-hours involved and the total memory cost (which is higher than an alogorithm). For example, a pre-set treasure spot may be placed on Liberty Island, N.Y. which may give the player a Statue of Liberty treasure. Such a feature may also be used for marketing partnerships. For example, if partnered with a burger servery, then pre-set treasure spot locations may be placed at every burger servery, which may open special content, e.g., promotional treasures.

FIGS. 4-11

Figure 4:
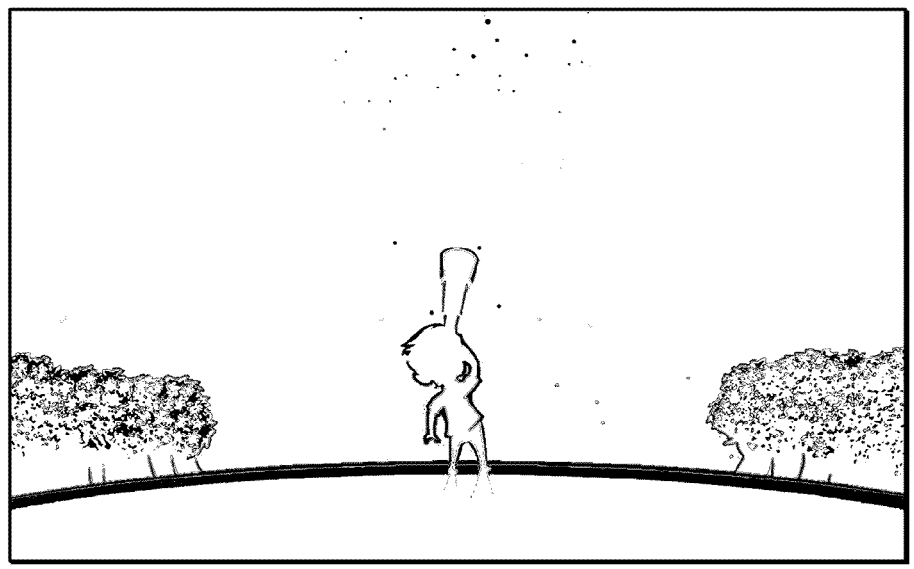
FIGS. 4-11 are exemplary screenshots of the method of FIG. 3, according to one embodiment.

FIGS. 4-11 provide an exemplary embodiment of a game referred to as "Treasure World", which may implement the method described above. Note that the method is not limited by the following descriptions, and that they are only supplied as one illustrative example. For example, while the following descriptions discuss execution and storage of the game on a Nintendo DS™, it may be executed on any of a variety of devices, such as the portable device described above. FIG. 4 is an exemplary introductory screen shot of the game, Treasure World.

Genre/category: Reality Game/Collection Game

Audience: Males and females ages 6-18 (primary). However, the game is designed to include systems that appeal to all ages. Treasure World is for people. Boys, girls, men, women, mothers, fathers, grandparents, Americans, Japanese, Europeans, etc. The game includes various features that will resonate and captivate various users. This "universal audience reach" is one of Treasure World's greatest strengths. This allure is maintained through a set of game play systems that have clearly defined "hooks" that cover a diverse set of play psychologies—such as creativity, curiosity, individuality, collecting and saving, physical activity, social contact, acceptance, and vengeance.

Delivery Platforms: Nintendo DS. Follow-up platforms for Apple iPhone/iPod Touch and Sony PSP Future platform expansion opportunities: Nintendo Wii/WiiWare, Sony PlayStation 3/PSN, Xbox 360/Live Arcade, applicable cellular phones, and personal computers.

Partnership/branding opportunities: Opportunities for partnerships and promotions with many well-known brands such as Starbucks, McDonald's, Wi-Fi providers (T-Mobile, etc.), JiWire (Wi-Fi finder and directory service), and many more.

The Hook and Grand Concept: Treasure World is a real life treasure hunt in which the Nintendo DS is your treasure detector, trophy case, and toy box for creative community play. The wireless hotspots, connected devices, and DS units worldwide lead to treasures that are uncovered when Treasure World spies them. The treasures you discover are not only symbols of your treasure-hunting efforts, but also tools for creatively customizing your own forest glade and its inhabitant. Share your imagination and individuality with an ever-growing and evolving community as you trade treasures, share photos of your glade, show off your swelling treasure count, and let others know where "X marks the spot."

There are three key concepts that drive Treasure World: real life treasure hunting for everybody, community interaction, and simple-yet-engaging "creative toys". Each player has his/her own moonlight-blanketed forest glade waiting to be filled with treasures and creatively crafted to their heart's desire. The DS acts as a round-the-clock treasure map all across the globe, as players carry it around to detect the countless wireless hotspots, other DS platforms, and various other "connected" devices that come in range. A streamlined, all-Touch Screen interface allows any player carrying Treasure World to travel around and discover those hotspots and score surprising treasures. The play itself is the real life adventure, wonder, and surprise of traveling and discovering treasures.

As they amass treasures, players can interact with the rest of the Treasure World community for a good bit of social engagement. Treasures can be traded and forest glade "photos" can be shared via the Nintendo Wi-Fi Connection or directly from DS-to-DS. Players can also compete to become the greatest treasure hunter in the world as their stash is tracked on the dedicated web destinations (which can be provided at no cost by Nintendo and GameSpy).

Treasures are not only a means to display player status, but also simple creative toys in and of themselves. Players can arrange their treasures—such as foliage, statues, signs, pottery, ground cover, and more—in imaginative ways to achieve their preferred aesthetic. Treasures also act as musical chimes and can be arranged to create pleasing melodies. The player's glade is not entirely deserted, either. A single inhabitant occupies the glade and can be customized with various treasures in the vein of clothing and accessories (note that the player does not control or assume the role of this character). This simple yet flexible power comes in handy for players who enjoy taking postcard snapshots of their glade for their own satisfaction or to share with others.

Treasure World is a low-commitment, high-reward, malleable experience that can be tailored to any given player's play patterns and desires. There is potential for reward and gratification for players who delight in discovering new treasures, those who enjoy dedicating time to customizing their glade, or those players who choose to dive into the deep community. No "quests" or fixed objectives requiring set periods of uninterrupted time are in place to tie the player down or hamper them from progressing.

Key Features

Real life game play: Play is focused on real life exploration, discovery, and interaction with others all over the world.

Full Wi-Fi integration: Play driven by the detection of nearby wireless hotspots and other DS platforms. Multiplayer trading, downloadable treasures, and more.

Customizable, creative play: Players build, customize, and share their very own "musical garden" and character.

Multiplayer trading, sharing, and interaction: Community play via local DS-to-DS connection and Nintendo Wi-Fi Connection (Internet).

Touch Screen control: The entire game interface is driven via easy-to-learn, easy-to-use Touch Screen interactions.

Casual hunting: "Casual hunt" mode affords convenient real life play while the DS is closed.

Special downloadable treasures: Special treasures, such as thematic or brand icon-based objects, can be created (e.g., by the developers, although other embodiments are envisioned) well after the product has been released and downloaded by the player via a connection (e.g., a WiFi connection) to the Internet.

Supports shared/cooperative play: Features such as "casual hunting" support, and encourage, family members sharing and cooperating in the hunt for treasures. Parents can play with their children as they drive them around to seek out farther-away Wi-Fi signals, or they can simply toss the DS into their purse or briefcase on their trip to work.

Portable game design: Game and interface design focused on the portable mentality and personal, emotional attachment.

Player-driven game flow: Each player manages the game pace, progress, and reward schedule as he/she desires.

Viral components: Many of the game systems are catalyst for word-of-mouth excitement that can spread quickly amongst acquaintances and through information networks (such as blogs and forums).

Differentiation and Strengths:

Never before has a video game's play primarily taken place in real life.

One-of-a-kind, innovative new experience.

Unique play systems tap into a vast range of play psychologies.

Universal audience reach.

Player-driven pacing, progress, and reward schedule.

Family members can share and cooperate in the experience.

Affords hooks for players of many different personalities and abilities.

Can be enjoyed and has play value far into the foreseeable future.

Opportunities

Expansion onto fixed platforms such as Nintendo Wii/WiiWare, Sony PlayStation 3/PSN, Xbox 360/Live Arcade, and PC/Mac.

Integration with a scalable internet-based community that can be continually grown and evolved after the product has been released.

Rich concept affords plenty of opportunities for sequels, expansions, and spin-offs.

Partnerships with existing brands.

Promotional outlet for existing external brands.

Comparable Experiences and Video Games

Treasure World has many commonalities with a large variety of timeless real life activities and successful works in other forms of media. Such works include:

Exploring/hiking, Easter egg/scavenger hunting, Internet clubs/communities, LEGO™, trading cards, Beanie Babies™, piggy bank saving, hobby collecting, hobby arts and crafts, reality TV shows, and more. There are currently no games that Treasure World can be directly compared to. However, there are components within a few games—such as Animal Crossing™, Nintendogs™, Pokemon™, and The Sims™—that share similar "play psychologies" and system analogies.

The Purpose & Design Goals

Embodiments of the invention, such as Treasure World, may achieve the following objectives:

Life=adventure. To help players realize that no matter how mundane or insignificant their life may seem, in truth it is actually a grand adventure. Life is a gift.

Discover yourself. To help players realize that they are unique, and their individuality is a gift. Discover what makes you who you are, and share it with the world.

The following Design Goals all serve to ensure that the software achieves the aforementioned Purposes:

Focused design across the board.

Play takes place in real life.

Low-commitment, high reward player experience.

Encourages emotional attachment.

Universal audience reach.

A toy box for personal experience development.

An uncontained experience.

Shared experience amongst family members.

Community potential.

Long-term, "evergreen" appeal and playability.

Build systems that have symbiotic marketing potential.

Play Modes

Figure 5:
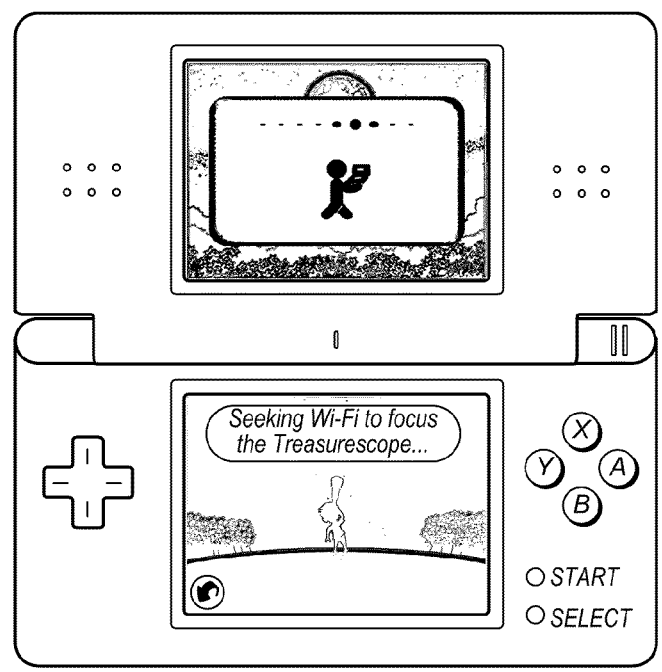

Treasure hunting: Treasure hunting in the real world is the heart of the Treasure World experience, so Hunt mode is designed with accessibility and ease-of-use at the forefront. In this mode, the DS seeks and detects Wi-Fi signals to discover hidden treasures all across the globe. Even if the DS is closed and stowed away in a pocket or a purse, Hunt mode still remains active and treasures are still collected. FIG. 5 provides an exemplary treasure hunting mode as shown being executed on a Nintendo DS™. As shown, the main character may be "Seeking Wi-Fi to focus the Treasurescope" in this screen shot.

Spoils of the hunt: After any successful treasure hunt, Spoils mode allows the players to view the new treasures that they discovered. Like a Christmas morning or a birthday party, the player gets to interactively "open" their rewards to discover each new treasure.

Treasure Box: The hoards of treasures that the player collects are stored in their Treasure Box. This mode acts as an inventory, management, and treasure "encyclopedia" all-in-one.

The Trove: The player's very own forest glade—or "Trove"—is where they go to display and creatively play with their treasures. In this mode, treasures can be arranged to build visually-pleasing gardens, landscapes, or any other surprising set up that a player may conjure. In addition, the Trove glade acts as a musical playground—each treasure placed on the ground plays a musical note when a wave-like swarm of fireflies contacts it in passing. The glade ground is laid out similar to a basic musical notation staff, so a treasure's position on the ground acts similar to a note's position on a staff. The further from the left a treasure sits, the later its note will play in the musical timeline. The higher the treasure sits on the vertical orientation, the higher its note's pitch is played. Also, the player's own customizable character inhabits the glade and can be dressed up with the various clothing, facial feature, and animation treasures that are discovered.

Figure 6:
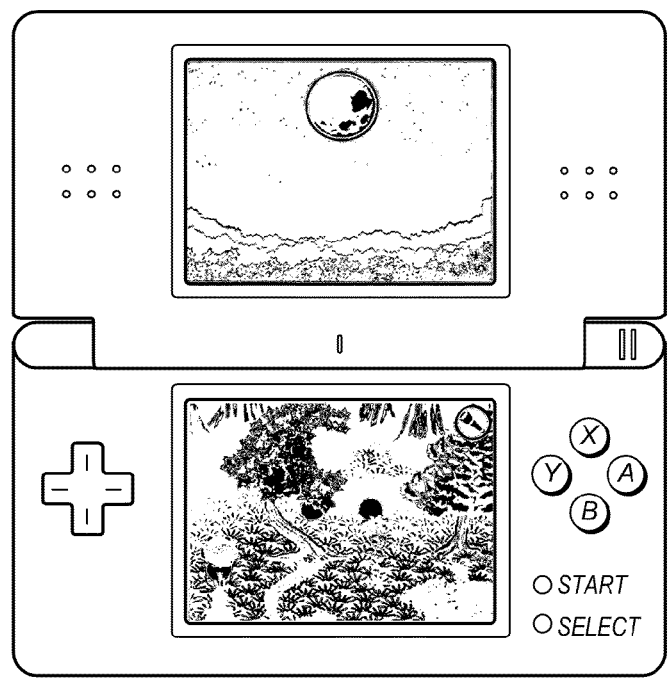
Figure 7:
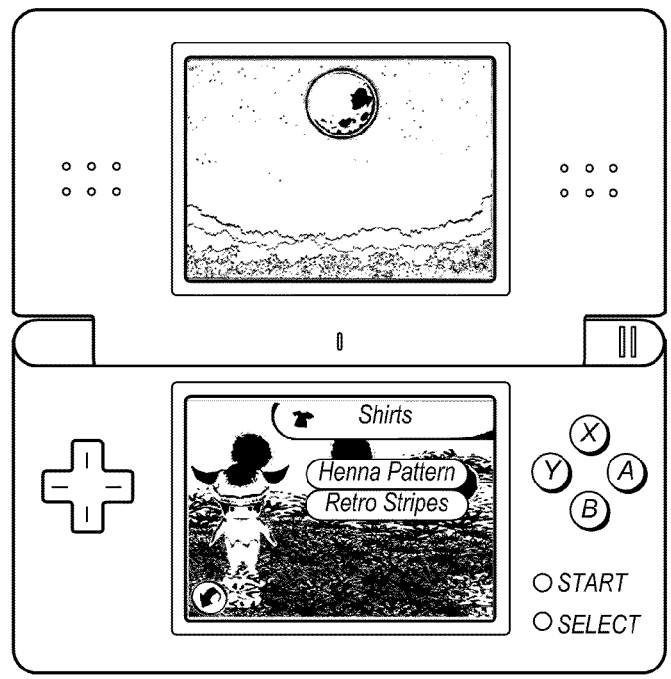
Figure 8:
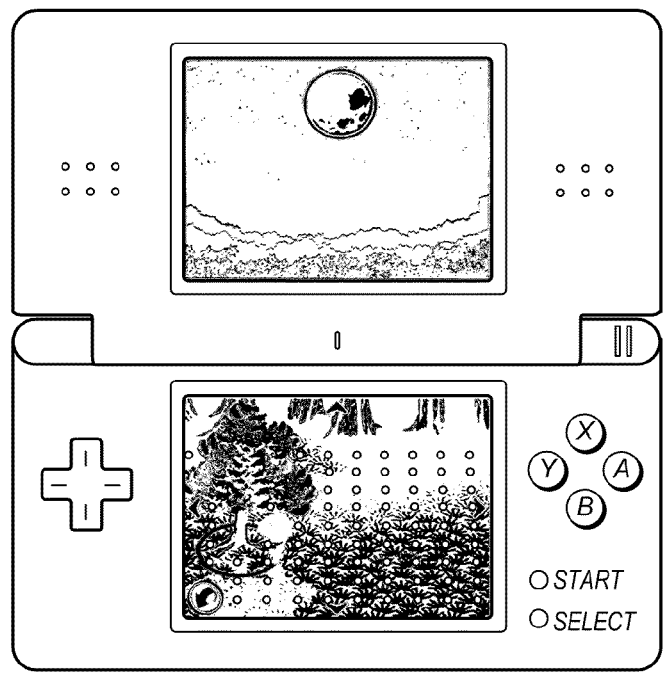

FIG. 6 illustrates an exemplary Treasure World and FIG. 7 illustrates a selection process for clothing the main character. More specifically, the user may choose "Henna Pattern" or "Retro Stripes" as a shirt choice. These choices may have been unlocked in the hunting mode above.

Merchant: Using Star Dust as currency—a little is gained from each new treasure that is discovered—the player can purchase treasures that they may find otherwise difficult to discover while hunting or trading. For example, a player in Mexico City may find it quite tough to travel all the way to Ireland to get a treasure from a local book store's Wi-Fi signal. And, this player may not know anybody who lives there who may be willing to trade for that treasure. However, after discovering enough treasures on her own, she will have accrued enough Star Dust to buy that elusive treasure. Merchant mode ensures that it will be possible for a player to achieve a complete treasure collection.

Community play: Various community-based play modes allow players to trade treasures, share "photos" of one another's Troves, share musical creations, compare the size of their hoards, and more.

Controls & Interfacing

Treasure World is completely controlled via streamlined, easy-to-learn Touch Screen interactions. The player interfacing is designed to be "self explanatory"—i.e. all of the controls are communicated via Touch Screen "buttons" that graphically convey the function they serve. This also means that any function the player can perform at any given time is readily present and in view. This approach supports the design goal of creating an experience for a universal audience.

During Hunt mode, the player even has the option of completely hands-off play. The DS can be closed and tossed into a pocket, purse, or briefcase and the game will still collect treasures whenever new Wi-Fi signals are detected—no control input or in-game interaction is required.

Snapshot of the Play Experience

When the player turns on Treasure World for the very first time, he/she is peering down over a character deep in slumber, being pestered to wake by a celestial "essence" zipping about. Once touched with the stylus, the character wakes and follows the essence as it flitters outside and into the nearby forest. The character becomes lost in the dense forest and eventually wanders into a moonlit glade where it glimpses the celestial essence as it shoots like a tiny comet up toward the pale, full moon (shown in FIG. 8). The character's attention is then piqued by something off screen, and it runs to investigate as an iconic touch button pops onto the corner of the Touch Screen. Once the player touches this button, the camera zips to find the character pondering over the fascinating and familiar form of a treasure chest nestled in the grass (the touch button slides off screen the moment that the character comes into view).

A touch on the treasure chest knocks the lid open, and a gleaming light reveals the player's very first treasure, a "Treasurescope," which is the player's key to endless real life adventures! From this point forward, the real world is put into a whole new perspective as the player hunts for treasures with which to continually transform their forest glade and its inhabitant.

The character marvels over this familiar, yet strange, telescope and quickly notices something else off screen. The character darts away, the touch button pops back onto screen, and the player touches it to follow. The character has discovered a radiant "X" marked on the ground by the beam of a star high in the heavens. At this moment, a Treasurescope touch button pops onto the screen, which "throbs" to pull attention. Following a touch of this button, the character props the Treasurescope to his eye and peers up toward the star. The top screen changes to show the character's view through the Treasurescope a radiant Treasure Star deep in the cosmos. Atop the crest of the Treasure Star sits a treasure chest, which pops open, sending the treasure within into the Treasurescope.

What strange power does this telescope have? Surprised, the character pops the treasure out of the Treasurescope as if trying to knock the last drop of ketchup out of a bottle.

The player touches the treasure to pop it open to reveal a fun new piece of clothing. Via intuitive, contextual Touch Screen mechanics, the player puts the clothing on the character, who expresses generosity before promptly noticing something else off screen. The player follows the character to find him standing on another star beamed "X" on the ground. Treasurescoping the cosmos reveals another Treasure Star with another treasure chest. This new chest contains a tree that plants itself in the ground after the treasure is pulled down to Earth and popped open. Using the same contextual Touch Screen mechanics as for the clothing, the player can replant the tree wherever they please within the glade.

The aforementioned interactive introductory scenario takes place in a time frame of no more than a few minutes, and then the player is free to hunt the real world for Wi-Fi signals and other players with their own DS units, customize and experiment with their glade and character, or interact with the Treasure World community.

Since real world treasure hunting is the core of the experience, Hunt mode automatically begins whenever the player turns Treasure World on. Hunt mode can be easily exited via a button on the Touch Screen. The mode can be re-entered just as easily via the Treasurescope touch button. Once hunt mode is engaged, the view transitions to simulate sight through the Treasurescope (just like looking through a telescope) on the Touch Screen, peering up into the gorgeous star-saturated cosmos. Other displays on the top screen give prompt feedback that supports and aids in treasure hunting, while touch buttons for necessary controls and commands are present on the bottom screen. When the DS detects a wireless signal, the 'scope view swings around to peer at a far-off Treasure Star. If any other signals are detected, then other Treasure Stars appear outside of the current view, and touch buttons allow the player to cycle the scope's focus between them. The player can close the DS while in Hunt mode and discover treasure casually as they move about the world. Conversely, the player can choose to take a more active role and watch as each treasure chest is pulled down to their glade from atop its Treasure Star.

Figure 9:
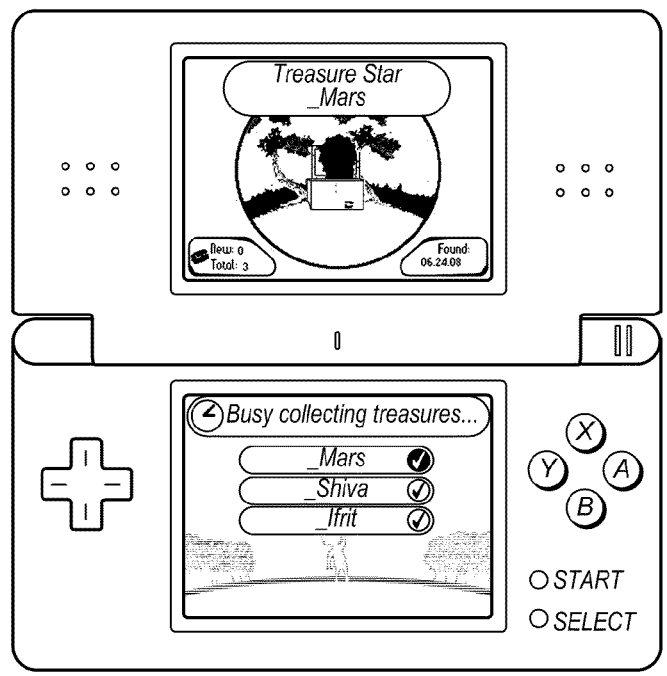

As shown in FIG. 9, the user has discovered three treasures ("Mars", "Shiva", and "Ifrit") and may choose any of these to unlock a treasure. Currently, the "Mars" treasure is being unlocked for use by the user.

As the player bolsters their Treasure World, the software awards them with special treasures, such as crowns, that signify their progress and motivates them to continue the hunt. Additionally, some treasures fit within thematic sets that act as clear collection goals for players to work toward.

Figure 10:
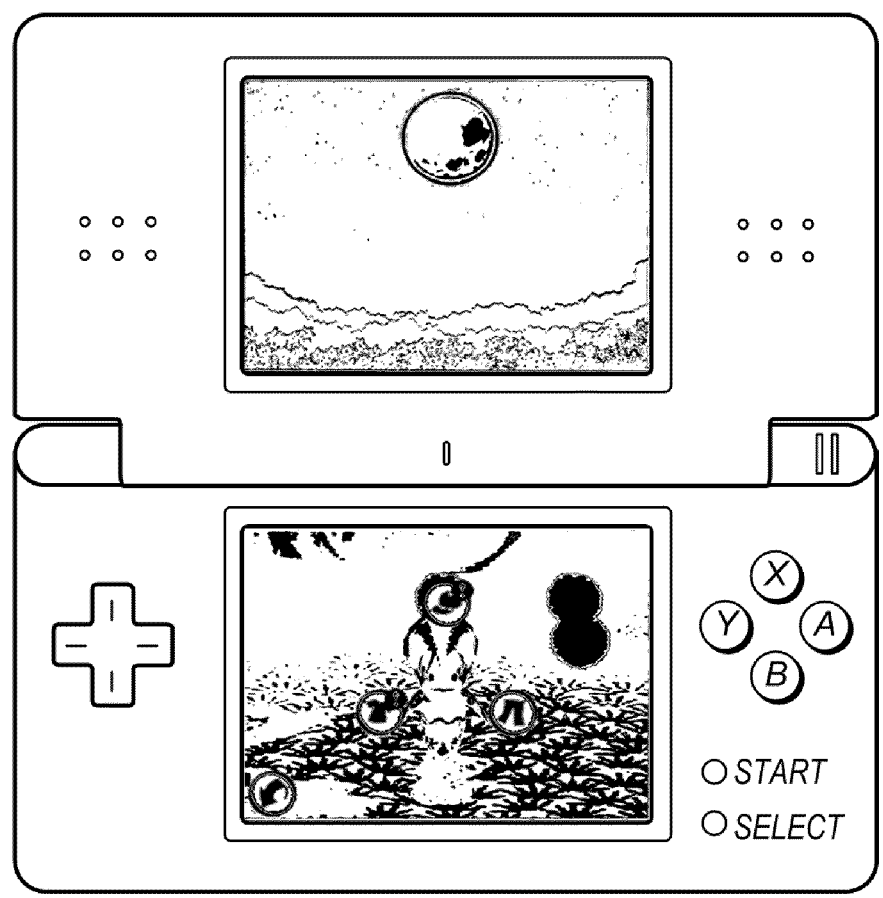

Customizing the forest glade and character with the treasures they discover is easy. The ¾ overhead view of the glade on the Touch Screen can be panned around simply by touching near the screen's edge, or can be instantly zipped over to focus on the character via a tap on the associated touch button. Context-sensitive touch controls act as intuitive tools for choosing and moving treasures around the glade and for re-outfitting the character (as shown in FIG. 10). Another touch button on screen gives the player access to "photo mode," which freezes all of the action in the world and allows the player to pan around and snap "photos".

Another set of simple touch controls and interfaces gives the player access to Treasure World community interactions suite. If another DS unit is detected while in hunt mode, an automatic prompt will let the player choose to directly view the other player's glade, share photos, and trade treasures. In addition, access to the Nintendo Wi-Fi Connection is accomplished in a minimal number of steps —where the player can also perform the same functions as with a local DS-to-DS connection (via friend codes), and also upload their current treasure hunting status to show off and compare with the rest of the world (this treasure hunting status can also be viewed on the Internet).

The frequency of play and the types of activities that each player chooses to engage in are completely up to them. Treasure World simply provides the toolset and toy box to access any of the three primary play functions (real life treasure hunting, island/castaway styling, and community interaction) in the most streamlined, usable, and accessible manner possible.

Player Motivators and Rewards

The desire to hunt and collect treasure is a natural part of human nature. Treasure World encourages this innate desire through various goals and satisfying reward systems. There are no explicit or required goals, but rather a vast number of implicit, optional goals: treasure count milestones, treasure set collection, purchasable treasures, and more. Such goals are never required or forced upon the player, but the game implies and encourages them through unobtrusive messages, icons, and other visual communication mechanisms (pulsing numbers when the player is close to achieving a treasure count milestone, for example).

The rewards for treasure hunting are many and varied. Every successful hunt rewards players with treasure objects—and each object may be rewarding to some players for different reasons than it is to other players. For some, the reward simply comes from growing their increasing trove of treasures. For others, each treasure object is another piece of the beautiful garden that they are crafting. Yet others may perceive the reward as an increase to their toolset for musical creation. For completing implied goals, players are rewarded with special treasure objects and "trophies." These signify their achievements, bolster their collection, and increase their treasure hunting abilities.

Since real life treasure hunting is the game, it can be considered that the entire experience is a constant and continuous motivation and reward system.

Setting, Scenario, & Fiction

Treasure World is the tale of the player's real life adventures and treasure hunting exploits—through play, and without exposition. Additionally, the mystery of a character lost in a moonlit forest is set up at the start of a new data file. What is this place in this tangled forest? The answers to these questions—along with whatever others the player ponders—are left to the imagination of each individual.

Play takes place in our own real world, but the core interfacing and interaction within the software takes place on the player's own evolving glade in the middle of a dense moonlit forest. This glade starts out as a barren grass clearing, and is shaped to the player's desire as they place their treasures all about.

The character in the glade is not controlled by the player. This character moves about and reacts contextually as a means to motivate, provide direction, and communicate certain play mechanics. At the start of a new data file, the character wakes in the middle of the night and wanders into a forest—where it starts in a "blank slate" state—i.e. donning nothing but bland pajamas. As the player amasses treasures, the character can be dressed to suit.

Essentially, the glade and character act as frameworks for the player's own creativity.

It's not long before the player discovers that there are Treasure Stars scattered deep in the cosmos. While treasure hunting, the player spies—through their Treasurescope—these Treasure Stars. These stars hold treasure chests for pilfering. Also, via DS-to-DS connection or the Nintendo Wi-Fi Connection, players can peer at one another's forest glades.

Aesthetic Design

One word adequately defines the aesthetic vision of Treasure World: "moonlight." The pure, ethereal, soothing, absorbing, uplifting sight and feeling of moonlight comes through across the entire presentation—from everything in the world, to the GUI and HUD, and to everything in between. Opening the DS should bathe any moment with the gleam of enriching moonlight—a nighttime retreat in your pocket.

Player interaction in their own forest glade is presented from a ¾ overhead perspective. The glade, character, and treasure objects are rendered in 3D in a style that strikes a solid balance between photographic and whimsical graphic design, which is carried over to animations, as well. Textures are simple, clean, and focused on color rather than complex detail in order to play hand-in-hand with a unique lighting system that casts clean, hard shadows and outlines the silhouette of every object with back-lighting brightness.

The top screen conveys the clear, starry night sky and gorgeous pale moon beaming its light down from above. While hunting for treasure, the top screen emulates a portal view through a spyglass as the player peers out into the cosmos. Here, the view presents other far-off Treasure Stars as they come in and out of focus.

The soothing sounds of the forest canopy shifting in the breeze are accompanied by the other recognizable sounds of nature in a thick forest. The chirp of crickets and the soft "pad-pad-pad" of the character's footsteps in the grass weave a backdrop of the tranquil audio experience. And, to emphasize this relaxing atmosphere, Treasure World keeps music to a minimum. A brief, iconic title track plays each time the software is turned on, and short melodious jingles alert the player to key moments and highlight rewards. The music is composed with simplicity and interactivity in mind, with a focus on infectious and memorable melodies and rhythms. There is no looping ambient music during core play time. However, the player may opt to create simple melodies and rhythms by populating treasures, which can be placed about and triggered like musical chimes on a time scale.

Game Modes, Structure, and Flow

Figure 11:
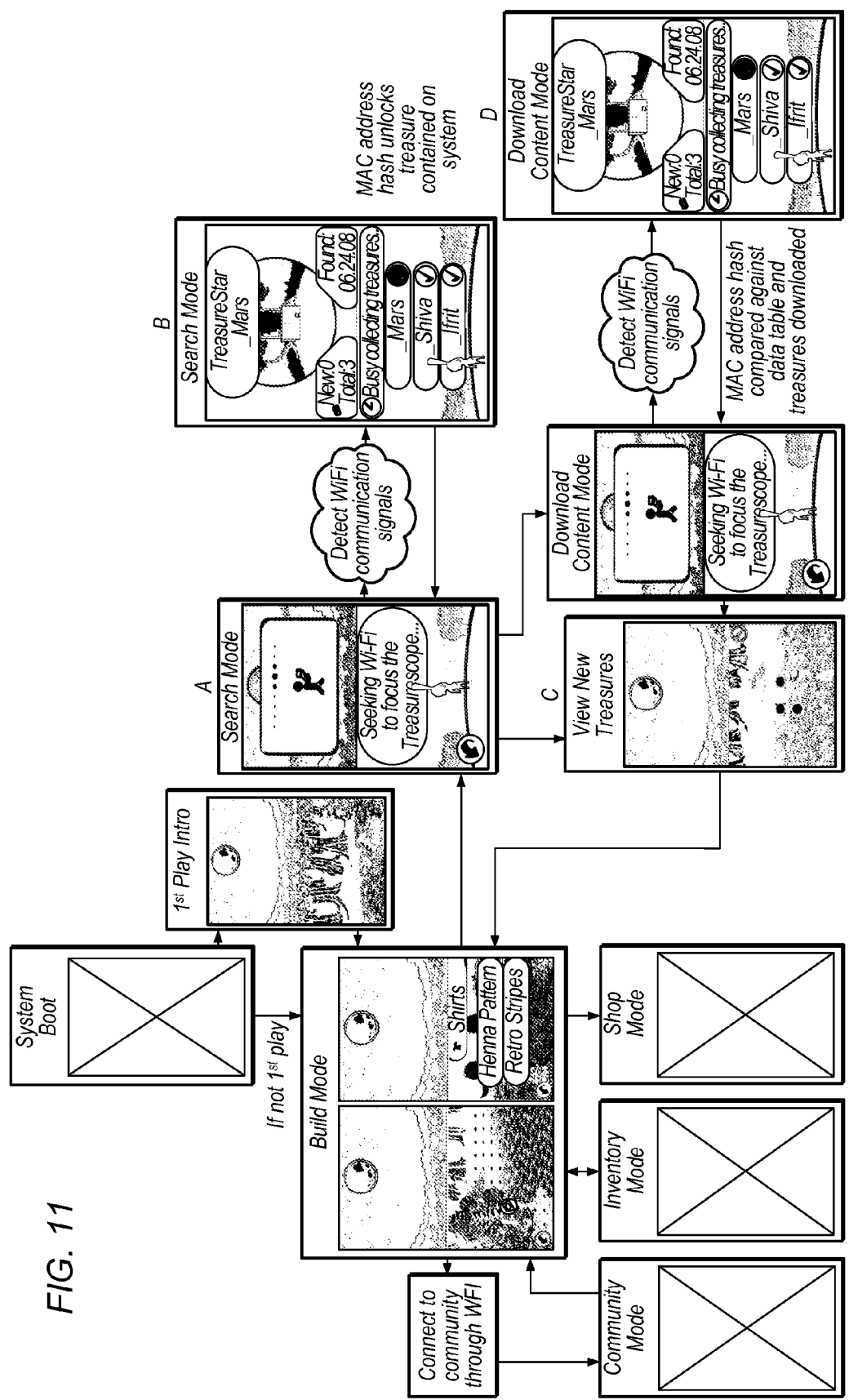

FIG. 11 provides an exemplary flowchart of execution of the game corresponding to the following descriptions.

Startup Mode

System boot-up, legal and title screens, etc. Links to: First Play Introduction mode, Build mode (shown in FIG. 11). Links from: System boot up (shown in FIG. 11).

First Play Introduction Mode

The first time the game is played ("1$^{st}$ Play Intro" in FIG. 11); this mode introduces the player to the concept, context, and basic operations of the game. In some embodiments, this mode only occurs once, e.g., the first time the game is played; however, it may be played again if all game data is erased/formatted.

Links to: Build mode. Links from: Startup mode.

Build Mode

Build mode ("Build Mode" in FIG. 11) allows the player to display and play with the treasures that they've discovered. Treasures can be used to build creative landscapes and gardens, and also act as musical chimes for building out melodies and songs.

Links to: Search mode, Inventory mode, Shop mode, Community mode.

Links from: Startup mode, First Play Introduction mode, View New Treasures, Inventory mode, Community mode.

Search Mode

Search mode ("Search Mode", "A", "B" in FIG. 11) allows the player to discover hidden treasures as the hardware detects wireless communication signals (transition from A to B in FIG. 11). Once a signal is detected, the software unlocks a reward and delivers it to the player.

Refer to the "Search mode functionality" section of this document for complete details of this mode.

Links to: View New Treasures, Special Search mode.
Links from: Build mode.

Download Content Mode

Download Content mode ("Download Content Mode", "C" in FIG. 11) allows the player to discover special hidden treasures that are created by the developers even after the game has been released. This is accomplished through a combination of wireless signal detection and data transfer between a server and the player's hardware/software ("Download Content Mode", "C", "D" in FIG. 11).

Refer to the "Download Content mode functionality" section of this document for complete details of this mode.

Links to: View New Treasures.
Links from: Search mode.

View New Treasures

In View New Treasures ("View New Treasures" in FIG. 11), the player views all of the new treasures that he/she discovered during either Search mode or Download Content mode. This mode also allows the player to choose whether to place any new treasure in their "Trove" (Build Mode), or store it in their inventory.

Links to: Build mode.
Links from: Search mode, Download Content mode.

Inventory Mode

The inventory acts as the player's catalog and encyclopedia of treasures ("Inventory Mode" in FIG. 11).

Links to: Build mode.
Links from: Build mode, Shop mode.

Shop Mode

Players can use currency that they amass during game play to purchase treasures directly from a Merchant ("Shop Mode" in FIG. 11).

Links to: Inventory mode.
Links from: Build mode.

Community Mode

Treasure World offers players a number of multi-player, community-based game play options—such as: trading treasures, sharing "photos" of one another's "Troves", and more ("Community Mode" in FIG. 11).

Links to: Build mode.
Links from: Build mode.

Specific Details Regarding Search Mode and Download Content Mode

Search Mode Functionality

Treasure World detects wireless communication signals and uses their unique identifier to determine which prize—or "treasure"—to reward the player with.

Treasure seeking (wireless detection) is active as long as the player has the game running in "Search mode". (See "Search Mode A" in FIG. 11).

Search mode is activated at the touch of an on-screen icon.

The player can leave the game in Search mode for as long as he/she desires, and treasure seeking runs without the need for player input.

Treasure seeking continues even if the player closes the DS while Search mode is active.

Once a wireless communication signal is detected, the game reads its unique identifier and "hashes" the data into a usable format (described in more detail below). In context, the player's "Treasurescope" tunes into the location of a "Treasure Star". (See "Search Mode B" in FIG. 11).

The hashed data is cross checked against a data table to find a treasure with the matching id. The game rewards the player with that treasure and adds it to his/her collection. After the player exits Search mode, they can play with the treasures that were collected.

Download Content Mode Functionality

Special Treasures may not be built into the game's asset base and treasure data table. (For example, the game software may launch with a fixed number of "normal" treasure assets/data contained on the ROM.). Instead, these treasures may be created after the game software has been released and delivered to the user via a different method than that which is outlined for normal treasure rewards.

Special Treasures' assets and data may be stored on the developer's own internet server. The developers may decide where a player must be, and when, in order to receive a Special Treasure reward by assigning the treasure a code that matches the hashed data of a chosen wireless communication signal's id, and setting a time window for discovery.

For example, the developer may create a code that matches the hashed data of a specific Wi-Fi access point at Disney World, and decides that the reward is available between Jan. 1st and Jan. 8, 2009. The player can search for Special Treasures by putting the game into Download Content mode. (See "Download Content Mode C" of FIG. 11).

Once this mode is active, if the game detects a viable wireless communication signal then it connects to a developer-maintained internet location. The game hashes the unique id of the connecting wireless communication signal and cross references it against the aforementioned developer-set code. If the hashed id and the code match, and the current date fits within the given time window, then the player has "discovered" the associated treasure. (See "Download Content Mode D" of FIG. 11).

If the software/hardware has enough save-game memory free, then the game downloads (from the aforementioned server) and stores the treasure's assets/data-rewarding the player with a new download treasure for their collection. More specifically, the portable device may connect to the server, and the server may compare the unlocked id with an id table. If one of the user's saved ID (of the unlocked treasure) matches an ID of a special collectible, then that collectible may be downloaded to the portable device. However, it should be noted that the downloading or unlocking of the treasure may occur at any location or any later time. However, in cases where the treasure must be downloaded, an Internet connection may be required. Once a download treasure is in the player's collection, it can be used in the same manner as normal treasures.

Data Hashing Basics

The game takes the ids of the wireless communication signals that it detects and "hashes" them into data that can be used in comparison against a table of treasures. Hashing is a procedure or mathematical function used to convert more complex/larger data into relatively small integer values. These converted values can then be used as an index or array. Hashing speeds up the computational task(s) of looking up items in tables/records and in data comparison. A hash table (or hash map) is a data structure that associates keys with values. In the case of Treasure World, a hash table associates hashed wireless communication signal id keys with treasure table values.

Additional Notes:

The game can detect multiple wireless communication signals at a time. The game can also reward the player with "Special Treasures" that are created and delivered by the developers. Refer to the "Download Content mode functionality" section for details. The outlined features and functionality are not tied/limited to the stated contextual elements such as the "Treasurescope", "Treasure Stars", etc. Treasure World is also being developed for Apple's iPhone/iPod Touch, Sony's PSP and WiFi capable mobile devices. The features and functionality, as outlined, also operate on these additional platforms.

Figure 12:
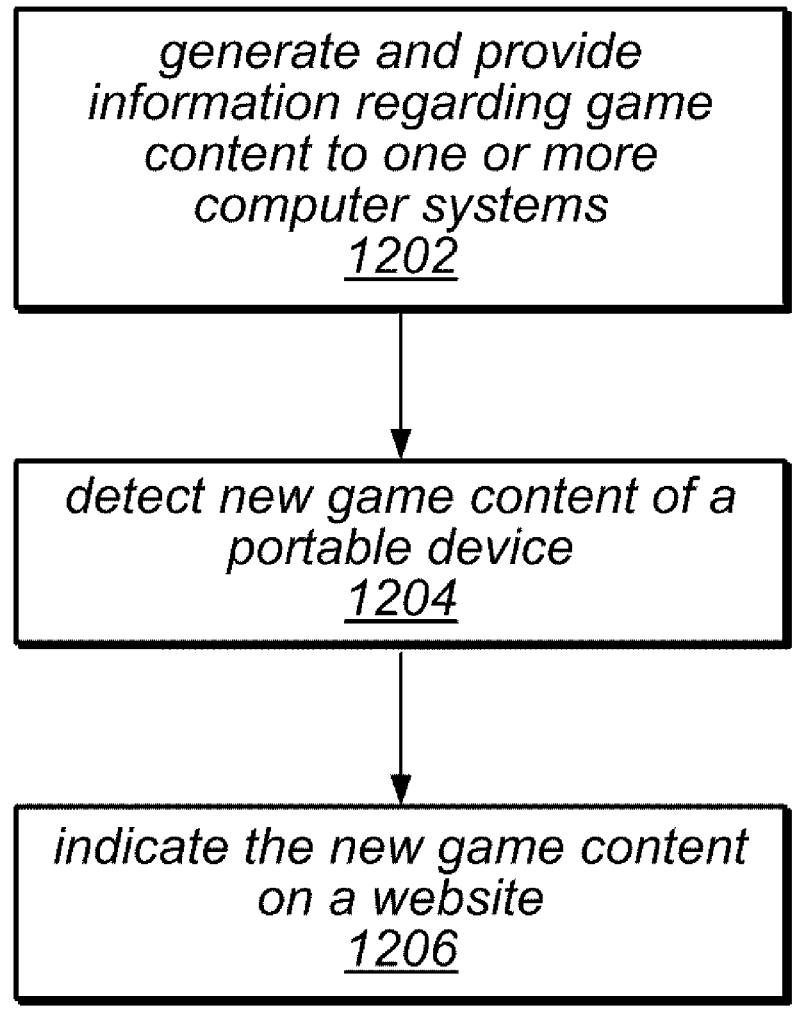
FIG. 12 is a flow chart diagram illustrating one embodiment of a method for transferring unlocked game content to a network.

FIG. 12—Transferring Game Content to a Network

FIG. 12 illustrates an exemplary method for transferring changed or new game content to a network. The method shown in FIG. 12 may be used in conjunction with any of the computer systems or devices shown in the above Figures, among other devices. For example, the new or unlocked content discussed in FIG. 12 may have been unlocked or obtained according to the method described in FIG. 3, among other possible processes. Thus, in some embodiments, the method of FIG. 12 may follow (e.g., continue on) from the method of FIG. 3. In various embodiments, some of the method elements shown may be performed concurrently, in a different order than shown, or may be omitted. Additional method elements may also be performed as desired. As shown, this method may operate as follows.

In 1202, information regarding game content may be automatically generated and/or the information may be provided to one or more computer systems (e.g., web server(s)) over a network (e.g., the Internet). The information may be provided by a portable device, which is configured to execute the game containing the game content.

In some embodiments, the information regarding game content may regard the game content discussed above, e.g., as described in 310 and regarding the related Figures. Thus, in one embodiment, the information may specify any new content that has been unlocked to the portable device. Alternatively, or additionally, the information may specify how various objects (e.g., old or new content) have been used in the game.

For example, the content may be an object or item (such as the treasures described above) that the user may use in the game, such as an item of apparel or clothing (e.g., a shirt, helmet, armor, boots, rings, amulets, necklaces, etc.). Thus, in this embodiment, the information may specify how objects have been (or are being) worn by the user (e.g., a character or avatar that the user controls) of the game. Alternatively, or additionally, the object may be a weapon, e.g., that may be equipped by a user of the game.

However, the object may not be a "wearable" object, but may be a pet, monster, stationary object, etc. For example, the object may be a plant (e.g., a tree), statue, body of water, fountain, etc., which may be arranged in a location of the game, e.g., a treasure scape area of the game. Thus, in such an embodiment, the information may indicate the object itself and/or the placement of the object.

As indicated above, the user may also create one or more songs in the game, e.g., by arranging objects or treasures in a specific order or sequence. Accordingly, the information may indicate or otherwise specify the one or more songs (e.g., a specification of the melody provided by the songs, a compressed version of the songs themselves, etc.).

In further embodiments, the content may be a new level or area for the user to play, among other embodiments. Accordingly, the information may indicate the new area of play.

The information may be provided in any of various manners or formats. For example, as discussed above, the information may be provided in an automatic manner at various times. In one embodiment, the information may be provided any time a network connection (e.g., an Internet connection) is available and/or there are any updates to be provided to the one or more web servers (e.g., regarding new or generated game content). Alternatively, or additionally, the information may be provided, automatically, in a periodic manner, or as close to a periodic manner as Internet connections allow, e.g., once a week, once a day, etc. Note that the automatic provision of this information means that the user does not have to manually go to the website and specify the new content described above. Thus, where the user has newly discovered a treasure, e.g., following the method of FIG. 3 above, the portable device may automatically provide information to the computer systems identifying the new treasure without the user having to perform any action.

However, it should be noted that the information may still be provided based on user input. For example, the user may provide user input that causes the provision of the data to the computer systems. More specifically, the user may select an option that invokes the provision of information (e.g., by selecting a "sync to website" option) to the web server without manually specifying the information (e.g., the change in apparel, new objects, etc.) that is provided. In this case, the user may be manually specifying the provision of data, but the particular data being provided is still automatically generated.

In various embodiments, the information being provided may list all of the available or unlocked objects or may only list the available or unlocked objects that are new since the last time information was provided (e.g., where the information is provided in a periodic manner, e.g., each time the game is used when a network connection is available). The list of objects may be provided as an XML file or any other appropriate file format.

Similarly, the information may specify all of the songs the user has created or may simply specify the new songs that have been created or discovered since the last time information was provided. The songs may be specified as MIDI files, XML files (e.g., specifying the melody of the song), or may simply be the songs themselves (e.g., in a compressed format, such as mp3 or other appropriate formats).

The information may also list all of the objects or items that are currently being worn by an avatar of the user in the game, or alternatively, may simply provide a model or image of the avatar. Where only differences are provided in the information, only items of apparel changed since the last update may be reflected in the information. In some embodiments, the information (e.g., all or a part of the information) of the avatar's appearance or clothing may only be provided when there is a change, although other embodiments are envisioned.

Thus, in 1202 various information regarding content of the game may be provided to one or more computer systems Where cumulative information regarding game content is provided in 1202, in 1204, changed or new game content of a portable or gaming device may be detected, e.g., by the one or more computer systems receiving the information. For example, the one or more computer systems may determine the difference between the information currently stored by the one or more computer systems and the information provided in 1202. Thus, the computer system(s) may perform a difference of the information and update the old information. Alternatively, the computer system(s) may simply replace the stored information with the new information without performing a difference.

However, in some embodiments, the differencing in 1204 may be performed by the portable device prior to providing the information, and therefore, in 1202, the provided information may only be "new" information and not cumulative information. Thus, where the user has unlocked three new objects or treasures since the last update to the computer systems, only these three new objects may be provided in the information rather than the all of the objects found or used in the game. Similarly, changes in appearance of an avatar or songs may only be new, as indicated above.

The computer systems may be configured to provide an indication of the content in the game on a web site based on the provided information. Thus, in 1206, the new game content (e.g., changed game content) may be indicated on a web site. For example, the web site may allow multiple users to display game information for each respective user in a user profile web site, thus providing a community for the users of the game. Each profile page may include an image of the avatar of the user (e.g., the character used in the game), various songs created or found by the user, and/or various objects discovered or unlocked for the user, among other possibilities.

The web site may also allow the users to interact with the game community. For example, the users may be able to trade various objects, songs, apparel, etc. In one embodiment, a user may have a jukebox of songs received or traded from other users of the web site. The users may also be able to send each other messages (e.g., synchronously (chat) or asynchronously), enter in contests, etc. In further embodiments, the web site may offer its own games, and users may play or participate in the games, possibly using the avatar created in the game on the portable device.

In some embodiments, whenever new game content is indicated on the web site in 1206, notifications of the new game content may be sent to other users on the web site. For example, where information is provided by a portable device of a first user, when an update occurs for that first user on the web site, the web site may also notify friends of the first user on the web site of the new game content. More specifically, a first user "Bob" may have one or more online friends "Jill" and "Jack" on the web site. Thus, when Bob has unlocked a new treasure and his device has provided information to the web site identifying the new treasure, the web site may update his profile to indicate the new treasure and may also send one or more messages or notifications of the new treasure to his friends Jack and Jill. The notifications may include a link to Bob's profile so that they may see the new treasure, or may even include an image of the new treasure in the notification. The notifications may be provided within the framework of the web site (e.g., as a message on the web site) or external to the framework of the web site (e.g., as an email). Note that users may be able to visit friends' (or even other users') profiles to view new content at any time.

Users may also be able to purchase items for their character or for use in the game, e.g., using in game currency or real currency, as desired. Thus, the web site may also act as a store front for in game or in web site items.

Additionally, any newly unlocked content, such as objects or clothing, may be used by the user to generate a web game on the web site. For example, the user may use a game maker system to build a web game using the content provided from the portable device. In one embodiment, the user can use any of the world decorations that they have found during the WiFi hunting and place them within a game level in the web game. Once the user is done with the game making level they then may have the opportunity publish the game for the entire web community to play. This way they can both use and show off all the objects that they have found in the real world in a virtual world. While the game making described above may be particularly devoted to game creation on the web site, in alternate (or additional) embodiments, the game may be created on the portable device (or other devices, such as computer systems) and transferred to the website.

Thus, game content (e.g., unlocked or customized by the user) may be indicated on a web site based on the information provided by the portable device. Note that while embodiments described in FIG. 12 relate to objects, apparel, and songs, any of various content or user customizations may be included in the information provided in 1202, compared in 1204, and indicated in 1206. Thus, the method of FIG. 12 may be generalized to any type of game content or user customizations.

Further Embodiment for Method of FIG. 12

In further embodiments, the method of FIG. 12 may also operate in the reverse fashion. More specifically, a user may be able to change any of the game content described above on the web site and that information may be provided back to the portable device. Consequently, the game on the portable device may be updated with the changes made to the web site.

As one example, the user may change the appearance of the character's avatar on the web site and that information may be provided back to the portable device (e.g., immediately, or the next time the portable device connects with the computer system(s), among other possible times). Then, when the user plays the game again on the portable device, the avatar's appearance may be updated to be the same as the changes that were made on the web site.

As another example, the user may create new song or receive songs (e.g., through trading) with other users. These new songs may be provided (e.g., as song files, XML files, or the like) to the portable device for use in the game.

Similarly, if the user is able to discover new items, or trade items with other users (among other ways of getting items), these new items may be provided to the portable device for use in the game. Note that when a trade is performed, some content may be removed from the game, e.g., the object(s) or item(s) that were traded to get the new item(s) or object(s).

Thus, while the method of FIG. 12 discusses changes made in the game on the portable device being provided and indicated on the web site, the process may also work in the reverse direction, allowing changes on the web site to be reflected in the game on the portable device.

FIGS. 13A-13E—Exemplary Screen Shots Corresponding to the Method of FIG. 12

FIGS. 13A-13E provide exemplary screen shots corresponding to the method of FIG. 12. Note that the method is not limited by the following descriptions, and that they are only supplied as one illustrative example.

Figure 13A:
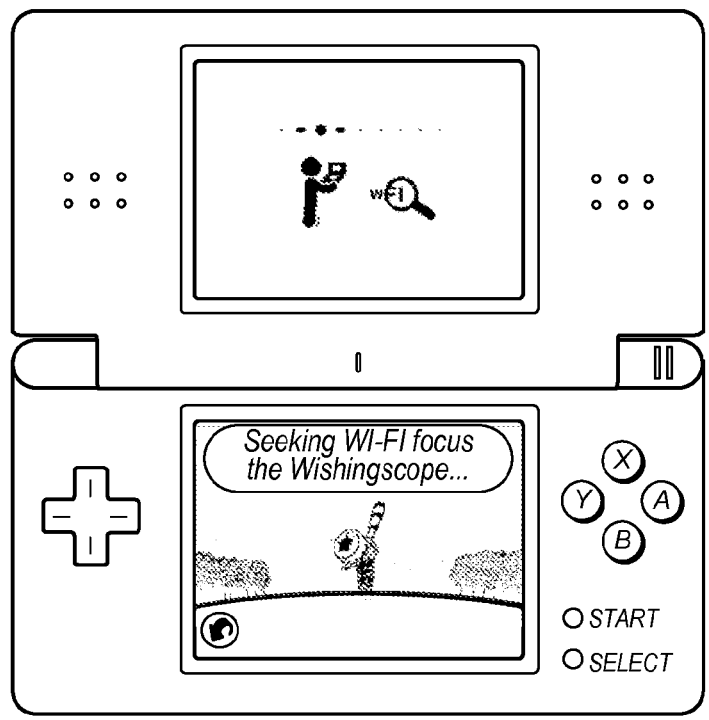
Figure 13B:
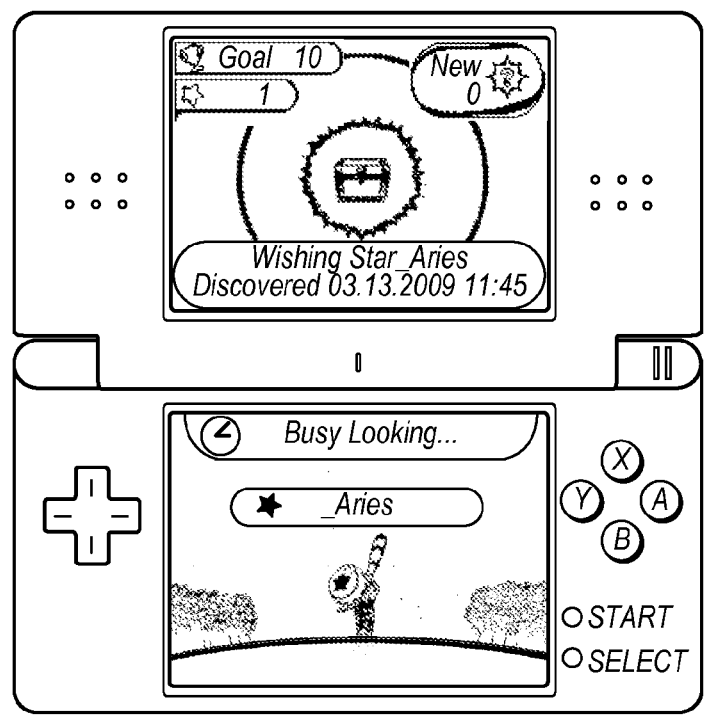

As shown in FIG. 13A, a user may locate treasure by traveling in the real world and locating Wi-Fi hotspots or GPS locations using a portable device. Correspondingly, in FIG. 13B, once a treasure spot is found, new game content may be unlocked, e.g., in the form of a treasure, e.g., in the portable device.

Figure 13C:
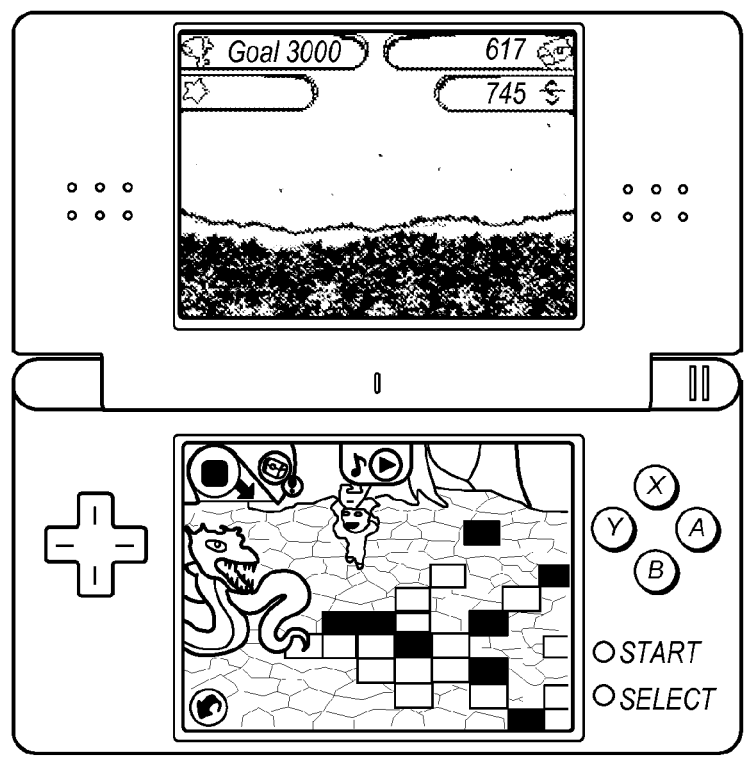
Figure 13D:
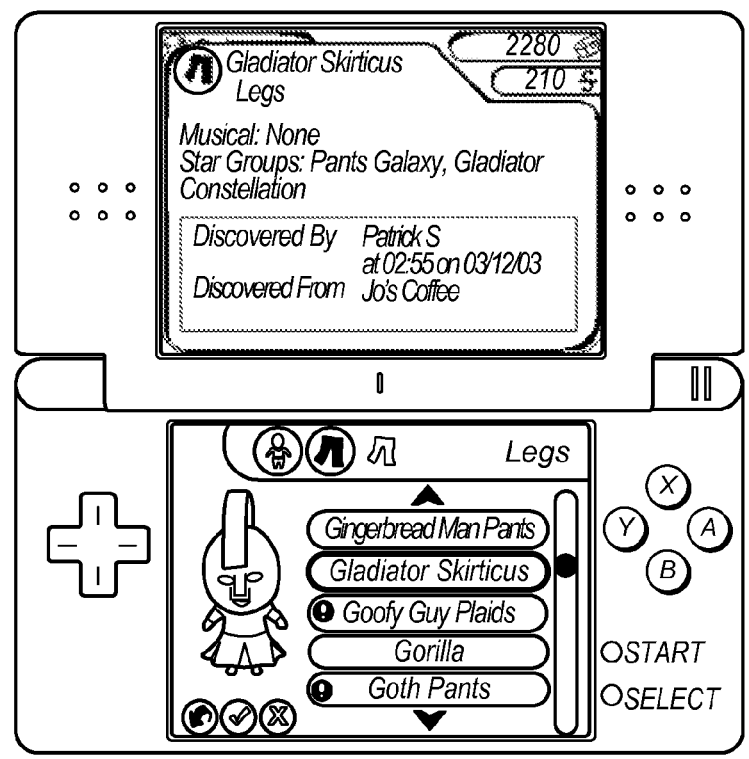

In FIGS. 13C and 13D, the user may customize the game world, e.g., in the portable device. For example, in FIG. 13C, the user may customize a treasure scape, e.g., by arranging treasures in a customized manner in a landscape. In FIG. 13C, the new content, in this case, a dragon, is arranged on the left portion of the treasure scape. Alternatively, or additionally, as shown in FIG. 13D, the user may customize the game character or avatar, e.g., using treasures as clothing for the avatar. For example, as shown, the user may have unlocked a Roman helmet treasure and may equip his avatar on the portable device with the Roman helmet. In further embodiments, the user may create songs on the portable device, e.g., via arranging treasures in the treasurescape, or a music scape. Thus, in FIGS. 13C and 13D, the user may customize the game world, e.g., using new or unlocked game content.

Figure 13E:
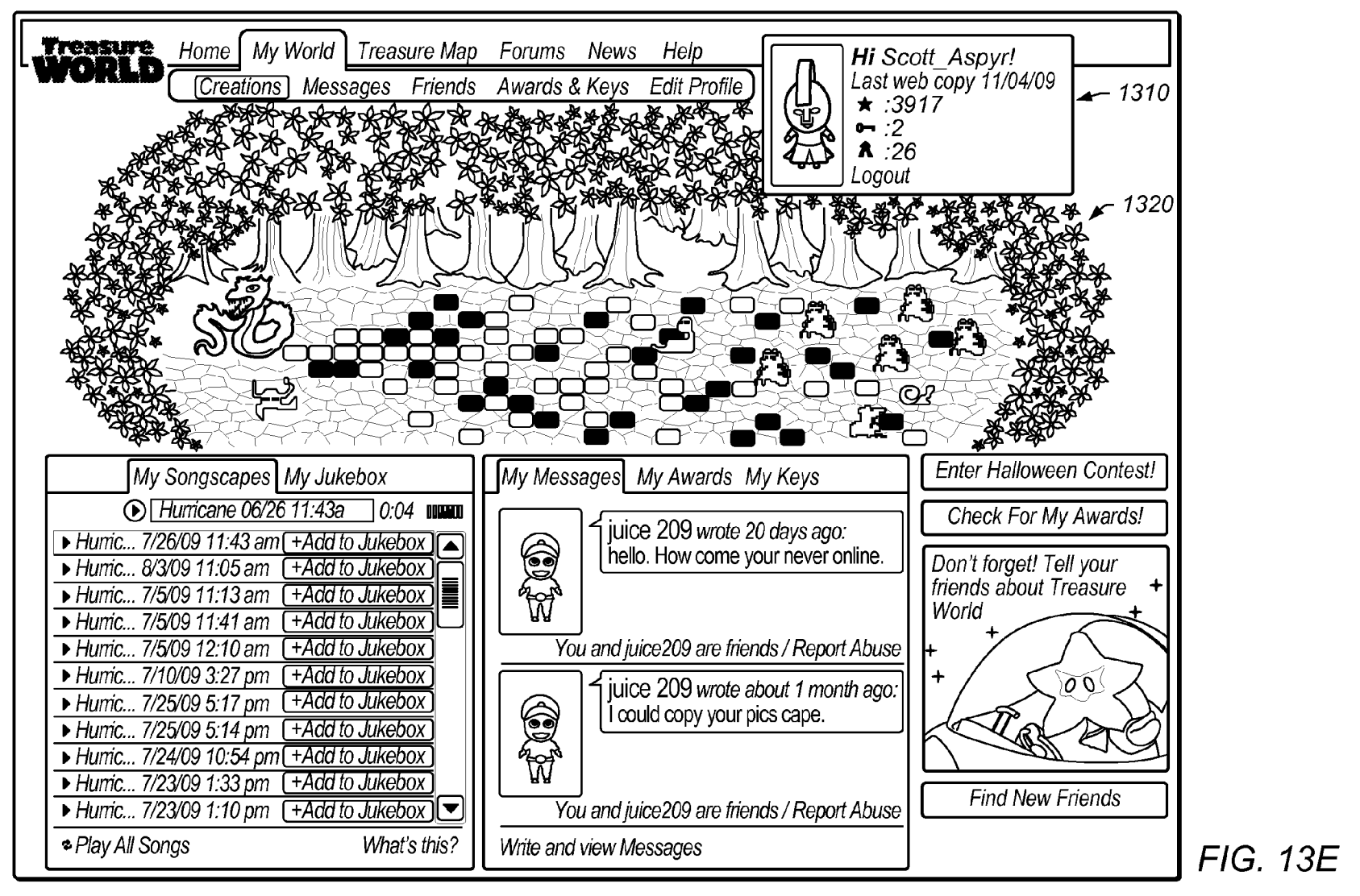

In FIG. 13E, the customization of the game world from 13C and 13D may be provided to a website, in this particular case, http://www.clubtreasureworld.com. As shown, the webpage for the user, "scott_aspyr" may be updated according to the customizations described above. For example, the avatar in 1310 may be updated to reflect the clothing change of FIG. 13D, which is updated to show the avatar wearing the Roman helmet. Additionally, the treasure scape may be shown in the webpage (1320) with the new treasure (e.g., the dragon found in 13A-13C is shown on the left portion of the treasurescape 1320).

As also shown in FIG. 13E, the user may access a "home" page (e.g., the home page of the treasure world, a "my world" section, including creations (shown), messages (e.g., from other users), friends (e.g., a list of friends the user may have on the website), awards & keys, and edit profile (e.g., to edit user information). The webpage may also include a "my songscapes" where songs created by the user, e.g., on the portable device, are updated on the webpage, as indicated above. The webpage may further include a "my jukebox" where the user may include his own songs or songs of other users, such as his friends. The webpage may also include a "my messages" section, where the user scott_ asypr has received two messages from user juice209. The webpage may further include a "my awards" and "my keys" section, as well as links to enter various contests, check for awards, and find new friends on the website. Thus, FIGS. 13A-13E provide examples of customizations to a portable game and updates to corresponding web site sections corresponding to the method described in FIG. 12. Note that these descriptions and depictions of the method of FIG. 12 are exemplary only and further variations are envisioned.

Although the embodiments above have been described in considerable detail, numerous variations and modifications will become apparent to those skilled in the art once the above disclosure is fully appreciated. It is intended that the following claims be interpreted to embrace all such variations and modifications.

We Claim:

1. A non-transitory computer accessible memory medium storing program instructions, wherein the memory medium is comprised in a portable device, wherein the program instructions are executable by a processor to:

present a game on a display of the portable device, wherein the game is configured to display various content on the display to provide entertainment to the user;

detect a wireless signal received by the portable device;

determine an ID of a wireless access point providing the wireless signal;

determine if the ID of the wireless access point is a new ID for the portable device;

based on the ID being new, provide content in the game based on the ID of the wireless access point, wherein the content was unavailable in the game prior to said detecting the wireless signal, and wherein the content was previously stored in a memory local to the portable device;

automatically generate information regarding the content in the game; and provide the information to one or more computer systems over a network, wherein the one or more computer systems are configured to provide an indication of the content in the game on a web site based on the information.

2. The non-transitory computer accessible memory medium of claim 1, wherein the program instructions are further executable to:

generate a hash of the ID;

wherein said providing content is based on the hash of the ID.

3. The non-transitory computer accessible memory medium of claim 1, wherein the content comprises a reward in the game based on discovery of a new wireless access point.

4. The non-transitory computer accessible memory medium of claim 1, wherein said providing content in the game comprises unlocking content in a game based on the wireless signal.

5. The non-transitory computer accessible memory medium of claim 1, wherein the content comprises an object, wherein said providing the content in the game comprises displaying the object on the display of the portable device, wherein the information regarding the content in the game specifies the object, and wherein the one or more computer systems are configured to provide the object for display on the web site based on the information.

6. The non-transitory computer accessible memory medium of claim 1, wherein the content comprises an article of clothing for an avatar, wherein said providing the content in the game comprises displaying the article of clothing on the avatar on the display of the portable device in response to user input, wherein the information regarding the content in the game specifies that the article of clothing is on the avatar, and wherein the one or more computer systems are configured to provide the article of clothing for display on a corresponding avatar on the web site based on the information.

7. The non-transitory computer accessible memory medium of claim 1, wherein the program instructions are further executable to:

receive user input using the content in the game to create one or more songs;

wherein the information regarding the content in the game comprises information corresponding to the one or more songs, and wherein the one or more computer systems are configured to provide the one or more songs on the web site based on the information.

8. The non-transitory computer accessible memory medium of claim 1, wherein said detecting the wireless signal is performed at a first physical location, and wherein the program instructions are further executable to:

detect a second wireless signal at a second physical location;

provide second content in the game based on said detecting the second wireless signal at the second physical location.

9. The non-transitory computer accessible memory medium of claim 1, wherein said providing the information is performed automatically without user input specifying the provision of the information.

10. A method, comprising:

presenting a game on a display of a portable device, wherein the game is configured to display various content on the display to provide entertainment to the user;

detecting a wireless signal received by the portable device;

determining an ID of a wireless access point providing the wireless signal;

determining if the ID of the wireless access point is a new ID for the portable device;

based on the ID being new, providing content in the game based on the ID of the wireless access point, wherein the content was unavailable in the game prior to said detecting the wireless signal, and wherein the content was previously stored in a memory local to the portable device; and providing information regarding the content in the game to one or more computer systems over a network, wherein the one or more computer systems are configured to provide an indication of the content in the game on a web site based on the information.

11. The method of claim 10, further comprising:
generating a hash of the ID;
wherein said providing content is based on the hash of the ID.

12. The method of claim 10,
wherein the content comprises a reward in the game based on discovery of a new wireless access point.

13. The method of claim 10, wherein the content comprises an object, wherein said providing the content in the game comprises displaying the object on the display of the portable device, wherein the information regarding the content in the game specifies the object, and wherein the one or more computer systems are configured to provide the object for display on the web site based on the information.

14. The method of claim 10, wherein the content comprises an article of clothing for an avatar, wherein said providing the content in the game comprises displaying the article of clothing on the avatar on the display of the portable device in response to user input, wherein the information regarding the content in the game specifies that the article of clothing is on the avatar, and wherein the one or more computer systems are configured to provide the article of clothing for display on a corresponding avatar on the web site based on the information.

15. The method of claim 10, wherein the program instructions are further executable to:

receive user input using the content in the game to create one or more songs;

wherein the information regarding the content in the game comprises information corresponding to the one or more songs, and wherein the one or more computer systems are configured to provide the one or more songs on the web site based on the information.

16. The method of claim 10, wherein said detecting the wireless signal is performed at a first physical location, and wherein the program instructions are further executable to:

detect a second wireless signal at a second physical location;

provide second content in the game based on said detecting the second wireless signal at the second physical location.

17. The method of claim 10, wherein said providing the information is performed automatically without user input specifying the provision of the information.

* * * * *